US011967296B2

(12) United States Patent
Li et al.

(10) Patent No.: US 11,967,296 B2
(45) Date of Patent: Apr. 23, 2024

(54) LIQUID CRYSTAL DISPLAY DEVICE AND DRIVING METHOD THEREOF

(71) Applicants: CHONGQING HKC OPTOELECTRONICS TECHNOLOGY CO., LTD., Chongqing (CN); HKC CORPORATION LIMITED, Guangdong (CN)

(72) Inventors: Zeyao Li, Chongqing (CN); Rongrong Li, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/958,557

(22) Filed: Oct. 3, 2022

(65) Prior Publication Data

US 2023/0138585 A1 May 4, 2023

(30) Foreign Application Priority Data

Oct. 29, 2021 (CN) ......................... 202111274828.2

(51) Int. Cl.
*G09G 3/36* (2006.01)

(52) U.S. Cl.
CPC .................................. *G09G 3/3677* (2013.01)

(58) Field of Classification Search
CPC ....... G09G 2310/08; G09G 2320/0214; G09G 2320/0238; G09G 3/3614; G09G 3/3611; G09G 3/3648
See application file for complete search history.

(56) References Cited

U.S. PATENT DOCUMENTS 6,373,479 B1 * 4/2002 Moon .................. G09G 3/3648 345/212
9,927,659 B2 * 3/2018 Park .................. G02F 1/136286
11,378,853 B2 * 7/2022 Lu ........................ G02F 1/13606
(Continued)

FOREIGN PATENT DOCUMENTS

CN 101206323 A 6/2008
CN 102736332 U 10/2012
(Continued)

*Primary Examiner* — Benyam Ketema
(74) *Attorney, Agent, or Firm* — Maier & Maier, PLLC

(57) ABSTRACT

In the field of liquid crystal display technology, a liquid crystal display device and a driving method thereof. The driving method includes steps of: detecting whether a light leakage has occurred in the liquid crystal display device; and adjusting a turn-off voltage output from a gate driver to a gate of a switch element to reduce an absolute value of a voltage difference between the turn-off voltage and a common voltage when the light leakage has occurred in the liquid crystal display device. In the embodiments, the phenomenon of light leakage at the dislocation caused by the dislocation between the color filter substrate and the array substrate when the liquid crystal display device is subjected to external pressure can be effectively improved, thereby improving the display effect of the liquid crystal display device.

14 Claims, 5 Drawing Sheets

(56) References Cited

U.S. PATENT DOCUMENTS

| | | | | |
|---|---|---|---|---|
| 2005/0168490 | A1* | 8/2005 | Takahara | G09G 3/3241 345/690 |
| 2007/0080905 | A1* | 4/2007 | Takahara | G09G 3/3258 345/76 |
| 2007/0182870 | A1* | 8/2007 | Lee | G09G 3/006 348/790 |
| 2008/0018634 | A1* | 1/2008 | Yeo | G09G 3/3648 345/208 |
| 2008/0030640 | A1* | 2/2008 | Hur | G02F 1/13624 349/48 |
| 2008/0084412 | A1* | 4/2008 | Bae | G09G 3/3611 345/212 |
| 2008/0246899 | A1* | 10/2008 | Tsai | G02F 1/136213 349/39 |
| 2009/0237578 | A1* | 9/2009 | Naka | G02F 1/133555 349/33 |
| 2012/0154728 | A1* | 6/2012 | Oh | G02F 1/1343 438/30 |
| 2013/0265527 | A1* | 10/2013 | Takeuchi | G02F 1/133711 349/86 |
| 2013/0300996 | A1* | 11/2013 | Takeuchi | C09K 19/04 349/182 |
| 2015/0015822 | A1* | 1/2015 | Park | G02F 1/136286 349/33 |
| 2016/0282646 | A1* | 9/2016 | Liu | G02F 1/133784 |
| 2016/0342002 | A1* | 11/2016 | Qin | G02F 1/133514 |
| 2017/0176825 | A1* | 6/2017 | Cao | G02F 1/134309 |
| 2017/0262114 | A1* | 9/2017 | Xie | G06F 3/04166 |
| 2019/0088228 | A1* | 3/2019 | Lee | G09G 3/3607 |
| 2020/0301215 | A1* | 9/2020 | Li | G02F 1/1362 |
| 2021/0280121 | A1* | 9/2021 | Nam | G09G 3/3685 |
| 2021/0382359 | A1* | 12/2021 | Lu | G02F 1/13439 |
| 2022/0302288 | A1* | 9/2022 | Yasuhara | H01L 29/0696 |
| 2022/0373790 | A1* | 11/2022 | Goldberg | G02B 27/0093 |

FOREIGN PATENT DOCUMENTS

| | | | |
|---|---|---|---|
| CN | 104280953 | A | 1/2015 |
| CN | 104778934 | A | 7/2015 |
| CN | 104880852 | A | 9/2015 |
| CN | 107589601 | A | 1/2018 |
| CN | 107633832 | A | 1/2018 |
| CN | 109509439 | A | 3/2019 |
| CN | 111443532 | A | 7/2020 |
| CN | 111722445 | A | 9/2020 |
| IN | 106652869 | A | 5/2017 |
| JP | 2008040448 | A | 2/2008 |
| KR | 20150007841 | A | 1/2015 |
| TW | 200841305 | A | 10/2008 |

* cited by examiner

LIQUID CRYSTAL DISPLAY DEVICE AND DRIVING METHOD THEREOF

CROSS-REFERENCE TO THE RELATED APPLICATION

Pursuant to 35 U.S.C. § 119 and the Paris Convention, this application claims the benefit of Chinese Patent Application No. 202111274828.2 filed Oct. 29, 2021, the content of which is incorporated herein by reference.

TECHNICAL FIELD

The present application relates to the field of liquid crystal display (LCD) technology, and more particularly, to a liquid crystal display device, and a method for driving the liquid crystal display device.

BACKGROUND

The statements provided herein are merely background information related to the present application, and do not necessarily constitute any prior arts. Usually, a liquid crystal display device includes a color filter (CF) substrate, an array substrate, and a liquid crystal filled between the color filter substrate and the array substrate. A photo spacer (PS) is usually used for support between the color filter substrate and the array substrate. The color filter substrate is provided with a public electrode layer and a black matrix (BM), and the array substrate is provided with a public electrode and a gate line at a position corresponding to the black matrix. When the liquid crystal display device is subjected to an external pressure, a dislocation may appear between the color filter substrate and the array substrate. At this time, due to the insufficient elastic recovery force of the photo spacer or the influence of the side groove of the array substrate, the dislocation cannot be restored after the external pressure disappears, resulting in part of the common electrodes and gate lines are shifted to the opening area of the color filter substrate, thereby causing light leakage at the dislocation.

SUMMARY

In view of this, embodiments of the present application provide a liquid crystal display device and a method for driving the liquid crystal display device. By reducing an absolute value of a voltage difference between a turn-off voltage of a switch element of the liquid crystal display device and a common voltage, the problem that light leakage at the dislocation caused by the dislocation between the color filter substrate and the array substrate when the liquid crystal display device is subjected to an external pressure can be solved.

In accordance with a first aspect of the embodiments of the present application, a driving method of a liquid crystal display device is provided, which includes steps of: detecting whether a light leakage is occurred in the liquid crystal display device; and adjusting a turn-off voltage output from a gate driver to a gate of a switch element when the light leakage is occurred in the liquid crystal display device, to reduce an absolute value of a voltage difference between the turn-off voltage and a common voltage.

In accordance with a second aspect of the embodiments of the present application, a liquid crystal display device is provided, which includes a gate driver and a switch element. The switch element includes an active layer.

The gate driver is in electrical connection with a gate of the switch element.

The gate driver is configured to output a turn-on voltage to the gate of the switch element, to control the switch element to be switched on, so that a channel formed in the active layer is on conduction.

The gate driver is configured to output a turn-off voltage to the gate of the switch element, to control the switch element to be switched off, so that the channel formed in the active layer when the switch element is switched on is off conduction.

The turn-off voltage is approximate to the common voltage and is lower than or equal to a cut-off voltage of the channel.

In accordance with a third aspect of the embodiments of the present application, a liquid crystal display device is provided, which includes a gate driver, a switch element, a memory, a processor, and a computer program stored in the memory and executable by the processor. When the computer program is executed by the processor, the steps of the driving method according to the first aspect of the embodiments of the present application are implemented.

The driving method of the liquid crystal display device in accordance with the first aspect of the embodiments of the present application, by detecting whether a light leakage is occurred in the liquid crystal display device; and adjusting the turn-off voltage output from the gate driver to the gate of the switch element to reduce the absolute value of the voltage difference between the turn-off voltage and the common voltage in case that the light leakage is occurred in the liquid crystal display device, can effectively improve the phenomenon of light leakage at the dislocation caused by the dislocation between the color filter substrate and the array substrate when the liquid crystal display device is subjected to the external pressure, thereby improving the display effect of the liquid crystal display device.

The liquid crystal display device in accordance with the second aspect of the embodiments of the present application includes a gate driver and a switch element, and the switch element includes an active layer. The gate driver is in electrical connection with the gate of the switch element. The gate driver is configured to output the turn-on voltage to the gate of the switch element is used to control the switch element to be switched on, so that the channel formed in the active layer is on conduction. The gate driver is configured to output the turn-off voltage to the gate of the switch element to control the switch element to be switched off, so that the channel formed in the active layer when the switch element is switched on is off conduction. The turn-off voltage is enabled to be approximate to the common voltage and lower than or equal to the cut-off voltage of the channel, so that the phenomenon of light leakage at the dislocation caused by the dislocation between the color filter substrate and the array substrate when the liquid crystal display device is subjected to the external pressure can be effectively improved, thereby improving the display effect of the liquid crystal display device.

It should be understood that, for beneficial effects in the third aspect, reference may be made to the relevant description in the first aspect, which will not be repeated here.

BRIEF DESCRIPTION OF DRAWINGS

In order to illustrate the embodiments of the present application more clearly, the following will briefly introduce the drawings that need to be used for describing the embodiments or exemplary technologies. Obviously, the drawings in the following description are merely some embodiments of the present application, and for those of ordinarily skills in the art, other drawings can also be obtained according to these drawings on the premise of paying no creative labor.

DETAILED DESCRIPTION OF THE EMBODIMENTS

Figure 1:
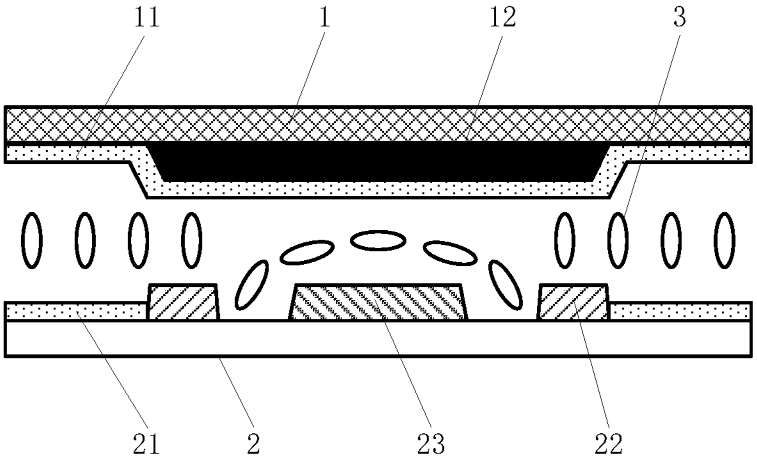
FIG. 1 is a schematic structural diagram of a liquid crystal display (LCD) device in accordance with an embodiment of the present application.

In the following description, for the purpose of illustration rather than limitation, specific details such as a specific system structure and technology are set forth in order to provide a thorough understanding of the embodiments of the present application. However, it will be apparent to those of ordinary skill in the field that the present application may be practiced in other embodiments without these specific details. In other instances, detailed descriptions of well-known systems, devices, circuits, and methods are omitted so as not to obscure the description of the present application with unnecessary detail.

It should also be understood that, as used in this specification and the appended claims, the term "and/or" refers to any of the associated listed items and all possible combinations of one or more of the associated listed items.

In addition, in the description of the specification and the appended claims of the present application, the terms "first", "second", "third", etc. are only used to distinguish the description, and should not be construed as indicating or implying relative importance.

References to "one embodiment" or "some embodiments" and the like, as described in this disclosure, mean that a particular feature, structure or characteristic described in conjunction with this embodiment is included in one or more embodiments of the present application. Thus, appearances of the phrases "in one embodiment," "in some embodiments," "in other embodiments," "in yet other embodiments," etc., in various places in this disclosure are not necessarily all refer to the same embodiment, but mean "one or more but not all embodiments" unless specifically emphasized otherwise. The terms "comprising", "including", "having" and their variants mean "included but not limited to" unless specifically emphasized otherwise.

A liquid crystal display (LCD) device and a method for driving the LCD device re provided by embodiments of the present application. By reducing an absolute value of the voltage difference between the turn-off voltage of the switch element of the LCD device and the common voltage, the phenomenon of light leakage at the dislocation caused by the dislocation between the array substrate and the color filter substrate when the LCD device is subjected to an external pressure can be effectively improved, thereby improving the display effect of the LCD device.

In application, the LCD device may include, but not limit to, a color filter substrate, an array substrate, and liquid crystals filled between the color filter substrate and the array substrate;

A photo spacer is used for support between the color filter substrate and the array substrate. The color filter substrate is provided with a common electrode layer and a black matrix. The array substrate is provided with a pixel electrode at a position corresponding to an opening area of the color filter substrate, and the array substrate is provided with a common electrode, a gate line, a data line and a switch element at a position covered by the black matrix.

The drain, source and gate of the switch element are respectively in electrical connection with the pixel electrode, the data line and the gate line, the data line is in electrical connection with the source driver, and the gate line is in electrical connection with the gate driver.

Based on the structure of the above-mentioned LCD device, the working principle of the LCD device is as follows:

The switch element is switched on when the turn-on voltage is output from the gate driver to the gate of the switch element through the gate line, and a data driving voltage is output from the source driver to the source of the switch element through the data line. At this time, an active layer of the switch element forms a conductive channel between the source and the drain, the data driving voltage is transmitted to the pixel electrode through the conductive channel between the source and the drain, and a pixel voltage is formed at the pixel electrode.

The liquid crystal molecules at the position of the pixel electrode are deflected under the action of the electric field generated by the voltage difference between the pixel voltage and a common voltage connected to the common electrode layer, and the light emitted by the backlight is refracted by the deflected liquid crystal molecules and then emitted from the color film substrate. The brightness of the emitted light is proportional to the voltage difference between the pixel voltage and the common voltage.

The switch element is switched off when the turn-off voltage is output from the gate driver to the gate of the switch element through the gate line, and the data driving voltage is output from the source driver to the source of the switch element through the data line. At this time, the channel formed on the active layer of the switch element is off conduction, so that the conduction between the source and the drain are cut off, and thus the data driving voltage output from the source driver cannot be transmitted to the pixel electrode.

In one frame time, the time for the gate driver to output the turn-off voltage is greater than the time for outputting the turn-on voltage. The charge retention function of a parallel plate capacitor (i.e., a storage capacitor) formed between the trace of the drain of the switch element and the trace of the common voltage or formed between the trace of the drain of the switch element and the gate of the next switch element, enables the voltage difference between the pixel voltage and the common voltage to be maintained until the beginning of the next frame after the switch element is switched off, so that the liquid crystal molecules are kept deflected within the one frame time.

Based on the above principles, the liquid crystal molecules at the positions of all the pixel electrodes of the LCD device are driven to deflect, that is, the LCD device displays one frame of screen.

In application, when the LCD device is subjected to a large external pressure, the dislocation may appear between the color filter substrate and the array substrate. At this time, due to the insufficient elastic recovery force of the photo spacer or the influence of the side groove of the array substrate, the dislocation cannot be restored after the external pressure disappears, resulting in part of the common electrodes and gate lines are shifted to the opening area of the color filter substrate. The liquid crystal molecules between the common electrodes and gate lines are deflected as the voltage difference is existed between the common electrode and the gate line. When the dislocation does not appear, due to the light blocking effect of the black matrix, the light emitted by the backlight board is refracted by the deflected liquid crystal molecules and thus cannot be exit from the color filter substrate. When the dislocation appears, the light emitted by the backlight board are refracted by the liquid crystal molecules between the shifted common electrode and gate line, and then emitted from the opening area of the color filter substrate, thereby causing light leakage at the dislocation. In case that the brightness of the liquid crystal pixels around the dislocation is high, the light leakage phenomenon at the dislocation will not have a great impact on the overall display effect of the LCD device. In case that the brightness of the liquid crystal pixels around the dislocation is low, the light leakage phenomenon at the dislocation will have a great visual impact on the overall display effect of the LCD device as the brightness of the light leakage at the dislocation is higher than the brightness of the surrounding liquid crystal pixels.

FIG. 1 exemplarily shows a schematic structural diagram of a liquid crystal display device.

Figure 2:
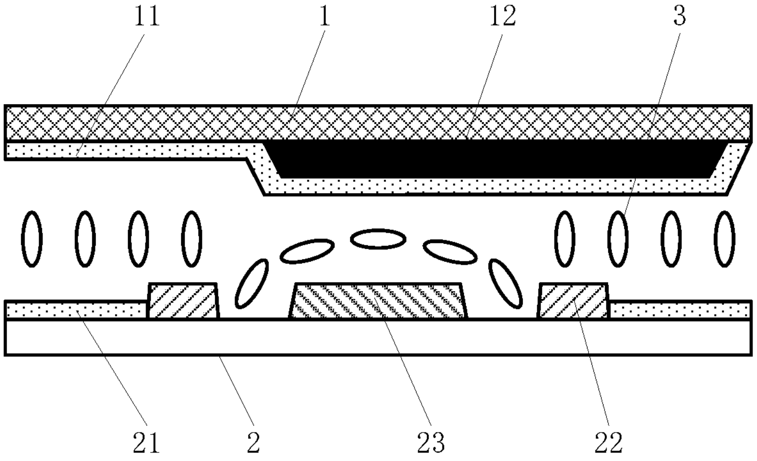
FIG. 2 is a schematic structural diagram of the LCD device when a dislocation appears between a color filter substrate and an array substrate in accordance with an embodiment of the present application.

FIG. 2 exemplarily shows a schematic structural diagram of a liquid crystal display device when the dislocation appears between the color filter substrate and the array substrate.

In FIGS. 1 and 2, 1 represents the color filter substrate, 11 represents the common electrode layer, 12 represents the black matrix, 2 represents the array substrate, 21 represents the pixel electrode, 22 represents the common electrode, 23 represents the gate line, and 3 represents the liquid crystal.

Figure 3:
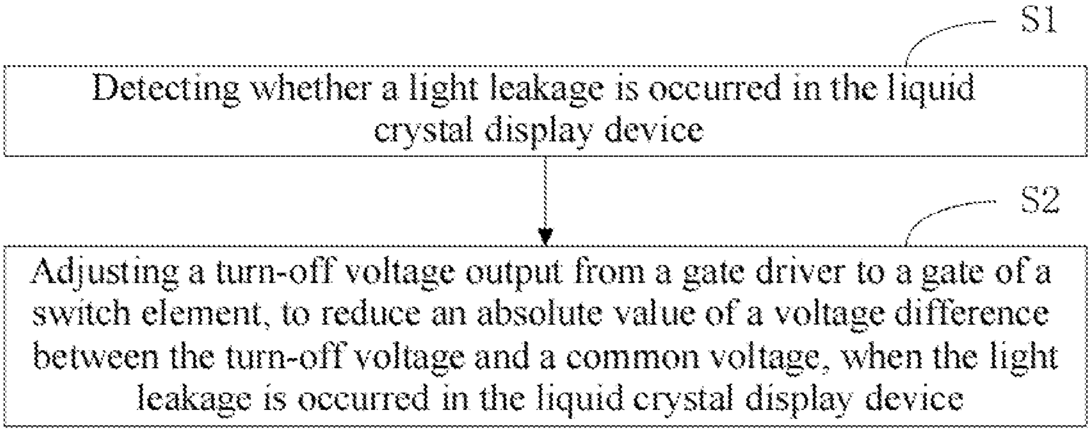
FIG. 3 is a first schematic flowchart of a driving method in accordance with an embodiment of the present application.

As shown in FIG. 3, the driving method of the LCD device provided by an embodiment of the present application includes the following steps S1 and S2.

In Step S1, it is detected whether a light leakage is occurred in the LCD device.

In Step S2, a turn-off voltage output from a gate driver to a gate of a switch element is adjusted when the light leakage is occurred in the LCD device, to reduce an absolute value of a voltage difference between the turn-off voltage and a common voltage.

In application, the absolute value of the voltage difference between the turn-off voltage and the common voltage may be reduced only when light leakage is occurred in the LCD device. The absolute value of the voltage difference between the turn-off voltage and the common voltage may not be reduced when the LCD device does not have a light leakage, It should also be understood that it may not be a prerequisite for the reducing of the absolute value of the voltage difference between the turn-off voltage and the common voltage whether the light leakage is occurred in the LCD device, in an exemplary embodiment, the absolute value of the voltage difference between the turn-off voltage and the common voltage may be reduced when the LCD device needs to display the screen after boot.

In application, since time for the turn-off voltage output from the gate driver, in one frame time, occupies the vast majority of the one frame time, it thus can be considered that the voltage on the gate line is the turn-off voltage for a long time. Due to the voltage difference between the common voltage and the turn-off voltage, the liquid crystal molecules at the dislocation are deflected and then light leakage occurs. Thus, the light leakage can be effectively improved by reducing the absolute value of the voltage difference between the turn-off voltage and the common voltage.

In one embodiment, the turn-off voltage output from the gate driver to the gate of the switch element is increased when the switch element is an N-type switch element, and the turn-off voltage output from the gate driver to the gate of the switch element is decreased when the switch element is a P-type switch element.

In application, the turn-on voltage>the common voltage>the turn-off voltage when the switch element is an N-type switch element, therefore, the turn-off voltage needs to be increased to reduce the absolute value of the voltage difference between the turn-off voltage and the common voltage. The turn-off voltage>the common voltage>the turn-on voltage when the switch element is a P-type switch element, therefore, the turn-off voltage needs to be decreased to reduce the absolute value of the voltage difference between the turn-off voltage and the common voltage.

Figure 4:
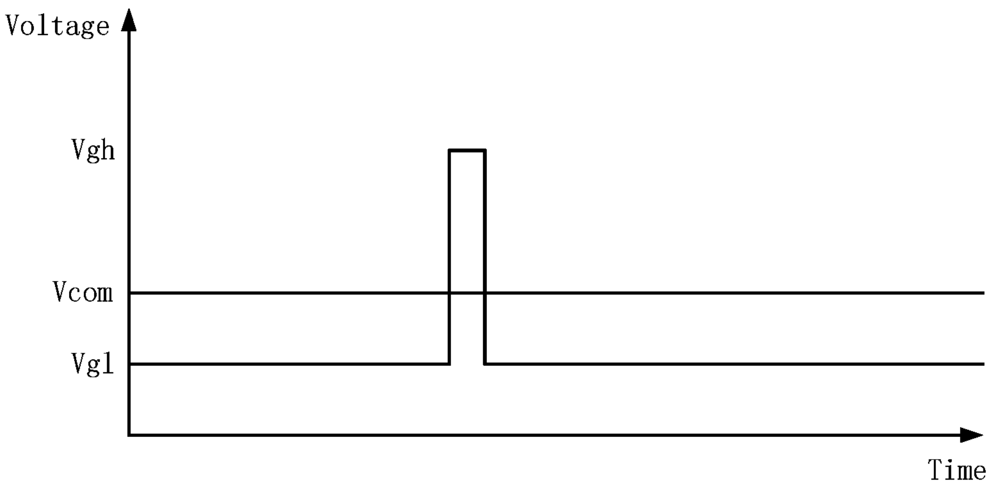
FIG. 4 is a waveform diagram of the voltage magnitudes of the turn-on voltage, turn-off voltage and common voltage before adjustment when the switch element is an N-type switch element in accordance with an embodiment of the present application.

FIG. 4 exemplarily shows waveform diagrams of the voltage magnitudes of the turn-on voltage, turn-off voltage and common voltage before adjustment when the switch element is an N-type switch element.

Figure 5:
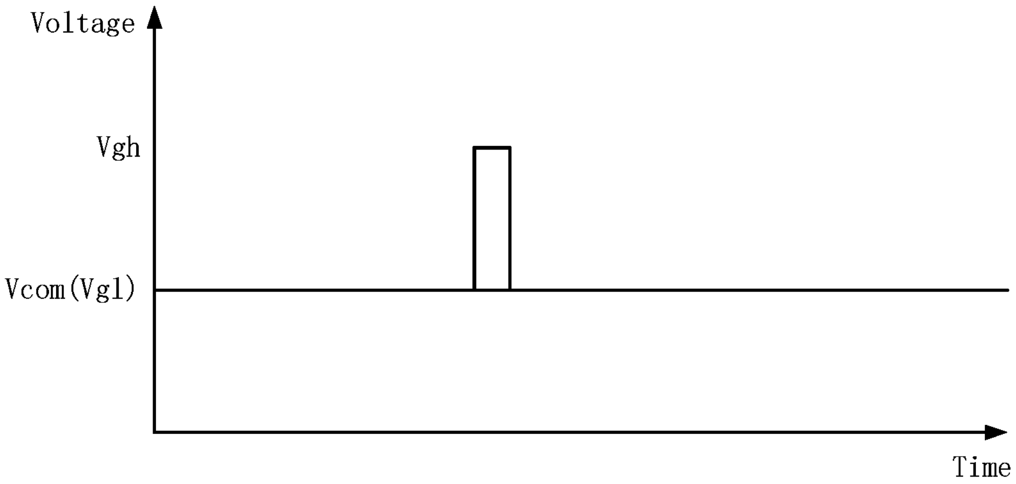
FIG. 5 is a waveform diagram of the voltage magnitudes of the turn-on voltage, turn-off voltage and common voltage after adjustment when the switch element is an N-type switch element in accordance with an embodiment of the present application.

FIG. 5 exemplarily shows waveform diagrams of the voltage magnitudes of the turn-on voltage, turn-off voltage and common voltage after adjustment when the switch element is an N-type switch element.

In FIGS. 4 and 5, Vgh represents the turn-on voltage, Vgl represents the turn-off voltage, Vcom represents the common voltage, the horizontal axis represents time (Time), and the vertical axis represents voltage (Voltage).

Figure 6:
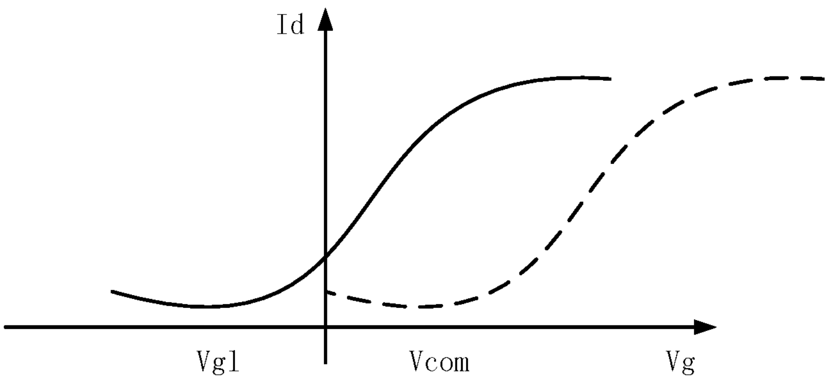
FIG. 6 is an IV characteristic curve of the switch element before and after adjustment when the switch element is an N-type switch element in accordance with an embodiment of the present application.

FIG. 6 exemplarily shows IV characteristic curves of the switch element before and after adjustment when the switch element is an N-type switch element. In FIG. 6, Vgl represents the turn-off voltage, Vcom represents the common voltage, and the horizontal axis represents the voltage (Vg). The vertical axis represents the current (Id), the solid curve is the IV characteristic curve of the switch element before adjustment, and the dotted curve is the IV characteristic curve of the switch element after adjustment.

Figure 7:
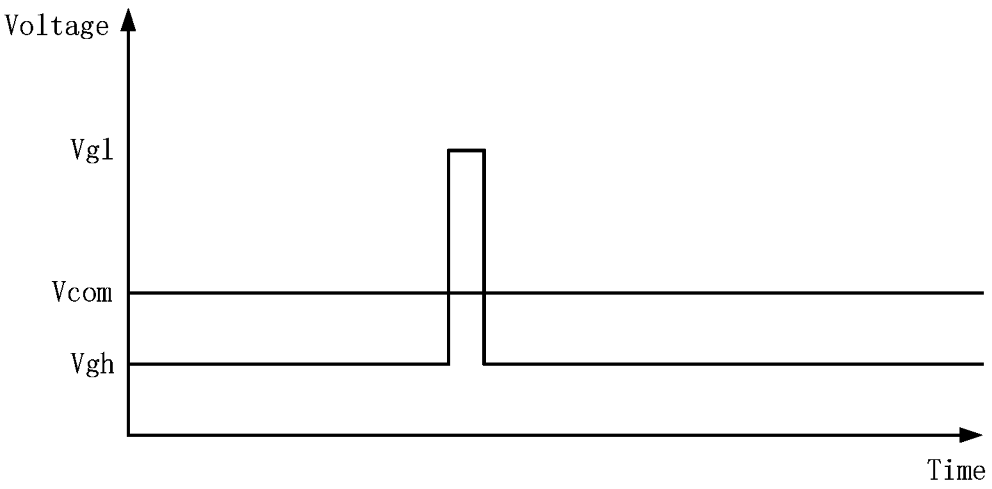
FIG. 7 is a waveform diagram of the voltage magnitudes of the turn-on voltage, turn-off voltage and common voltage before adjustment when the switch element is a P-type switch element in accordance with an embodiment of the present application.

FIG. 7 exemplarily shows waveform diagrams of the voltage magnitudes of the turn-on voltage Vgl, turn-off voltage Vgh and common voltage Vcom before adjustment when the switch element is a P-type switch element.

Figure 8:
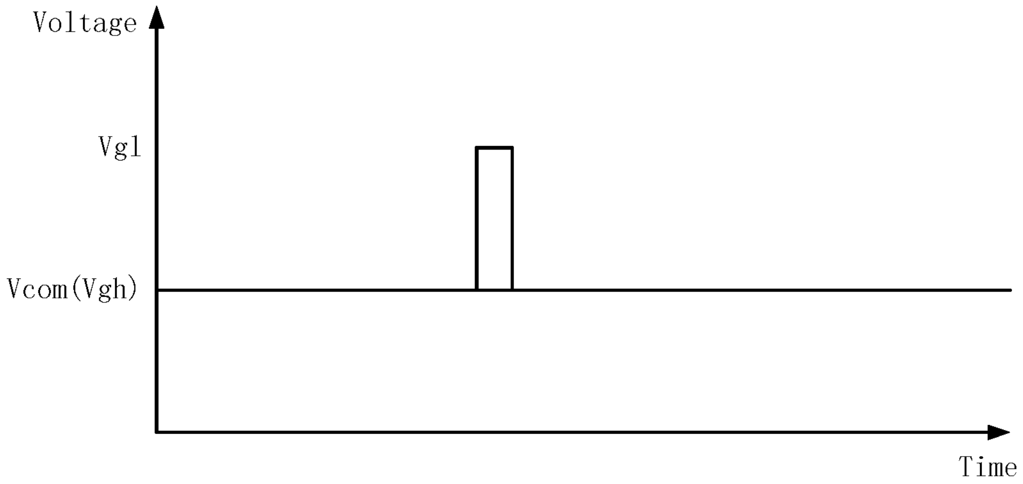
FIG. 8 is a waveform diagram of the voltage magnitudes of the turn-on voltage, turn-off voltage and common voltage after adjustment when the switch element is a P-type switch element in accordance with the embodiment of the present application.

FIG. 8 exemplarily shows waveform diagrams of the voltage magnitudes of the turn-on voltage Vgl, the turn-off voltage Vgh and the common voltage Vcom after adjustment when the switch element is a P-type switch element.

In FIGS. 7 and 8, Vgl represents the turn-on voltage, Vgh represents the turn-off voltage, Vcom represents the common voltage, the horizontal axis represents the time (Time), and the vertical axis represents the voltage (Voltage).

Figure 9:
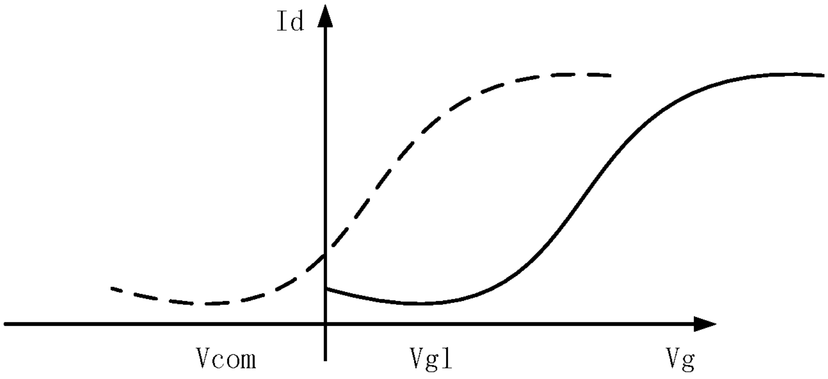
FIG. 9 is an IV characteristic curve of the switch element before and after adjustment when the switch element is a P-type switch element in accordance with an embodiment of the present application.

FIG. 9 exemplarily shows the IV characteristic curves of the switch elements before and after adjustment when the switch element is a P-type switch element. In FIG. 9, Vgh represents the turn-off voltage, Vcom represents the common voltage, and the horizontal axis represents the voltage (Vg). The vertical axis represents the current (Id), the solid curve is the IV characteristic curve of the switch element before adjustment, and the dotted curve is the IV characteristic curve of the switch element after adjustment.

In application, the turn-off voltage after adjustment may be equal to the common voltage or infinitely close to the common voltage, and the specific adjustment range can be set according to actual needs. The smaller the absolute value of the voltage difference between the turn-off voltage and the common voltage, the better the improvement effect of the light leakage. When the absolute value is equal to 0, the light leakage does not occur in the liquid crystal display panel within the time period during which the gate driver outputs the turn-off voltage in one frame time.

Figure 10:
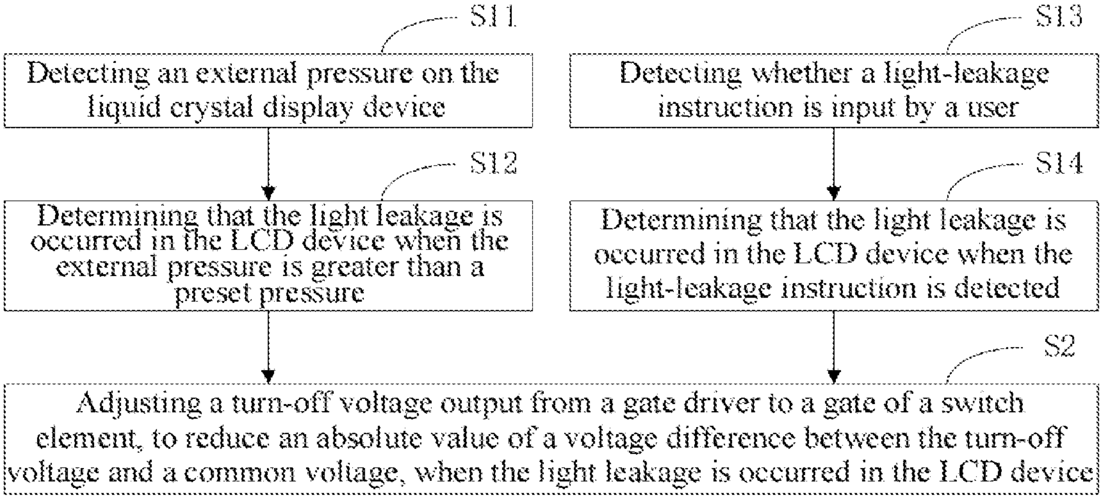
FIG. 10 is a second schematic flowchart of a driving method in accordance with an embodiment of the present application.

As shown in FIG. 10, in one embodiment, the step S1 also includes the following steps S11 and S12, and/or steps S13 and S14.

In step S11, an external pressure acted on the LCD device is detected.

In step S12, it is determined that the light leakage is occurred in the LCD device when the external pressure is greater than a preset pressure.

In step S13, it is detected whether a light-leakage instruction is input by a user.

In step S14, it is determined that the light leakage is occurred in the LCD device when the light-leakage instruction is detected.

In application, whether the light leakage is occurred in the LCD device may be determined by detecting a magnitude of the external pressure acted on the LCD device. For example, the external pressure acted on the LCD device may be detected by a pressure sensing element disposed on the LCD device.

In application, the pressure sensing element may be arranged at a position covered by the black matrix in the LCD device, for example, a position on the color filter substrate or the array substrate that is covered by the black matrix. When the pressure sensing element is arranged on the color filter substrate at a position that is covered by the black matrix, when the LCD device is subjected to the external pressure, the pressure sensing element is closer to the force applying object, so the external pressure can be detected more accurately. When the LCD device is a touch display device, the existing touch sensing elements of the LCD device can be directly used to detect the external pressure.

In application, since the photo spacer has a certain elastic restoring force, the dislocation may not appear between the color filter substrate and the array substrate when the external pressure is small, that is, the dislocation appears only when the external pressure is greater than the maximum pressure that the photo spacer can withstand. Therefore, the light leakage of the LCD device can be determined by comparing the magnitudes of the external pressure and the maximum pressure that the photo spacer can withstand. The preset pressure is the maximum pressure that the photo spacer can withstand, measured in advance through experiments.

In application, the light-leakage instruction may also be input to the LCD device by the user after seeing the light leakage from the LCD device with the naked eye, enabling the LCD device to determine that the light leakage is occurred in itself. The light-leakage instruction can be input by the user through the human-computer interaction device of the LCD device or the human-computer interaction device of a user terminal capable of communicating with the LCD device, enabling the LCD device to determine that the light leakage is occurred after receiving the light-leakage instruction.

In application, the human-computer interaction device may include at least one of a physical bottom, a touch sensor, a gesture recognition sensor and a voice recognition unit, so that the light-leakage instruction can be input by the user through a corresponding touch mode, gesture control mode or voice control mode. The physical bottom and the touch sensor may be arranged at any position of the LCD device or the user terminal, for example, a control panel. The control mode of the physical button may be pressing or toggling. The control mode of the touch sensor may specifically be pressing or touching. The gesture recognition sensor may be arranged at any position outside the casing of the LCD device. The gestures used to control the LCD device or the user terminal can be customized by the user according to actual needs, or the factory default settings can be adopted. The voice recognition unit may include a microphone and a voice recognition chip, or may only include a microphone and the voice recognition function may be implemented by the LCD device or the processor of the user terminal. The voice used to control the LCD device or the user terminal can be customized by the user according to actual needs, or the factory default setting can be adopted.

In application, the user terminal may be a mouse, a remote control, a mobile phone, a tablet computer, a wearable device, an augmented reality (AR)/virtual reality (VR) device, a laptop, an ultra-mobile personal computer (UMPC), a netbook, a personal digital assistant (PDA) and other devices capable of controlling the LCD device.

In application, the light-leakage instruction may also be input by the user in any scenario when necessary, to enable the LCD device to reduce the absolute value of the voltage difference between the turn-off voltage and the common voltage to prevent the occurrence of light leakage, rather than inputting the light-leakage instruction to solve the problem of light leakage after the light leakage is occurred.

In application, the LCD device may have both a function of detecting the external pressure acted on the LCD device and a function of detecting whether a light-leakage instruction is input by the user. These two functions may be performed simultaneously or may be performed separately.

Figure 11:
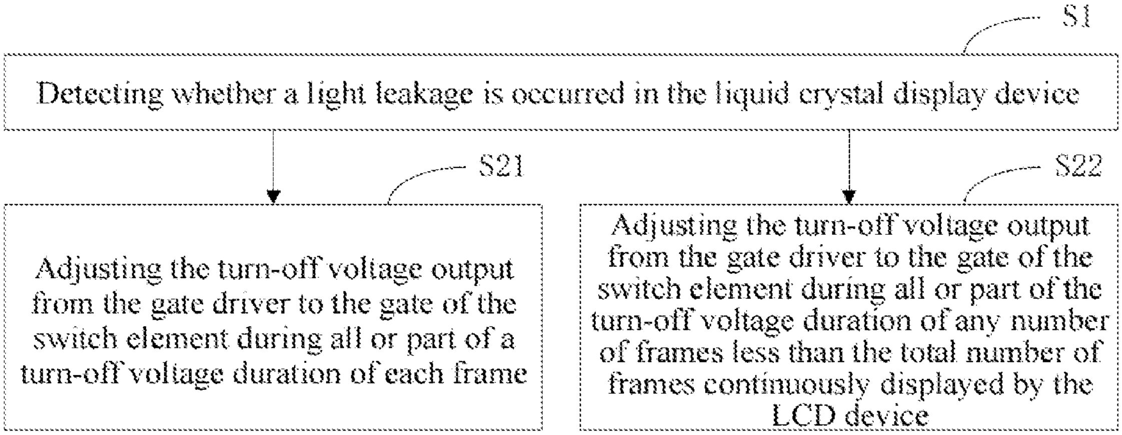
FIG. 11 is a third schematic flowchart of a driving method in accordance with an embodiment of the present application.

As shown in FIG. 11, in one embodiment, the step S2 includes the following steps S21 or S22.

In step S21, the turn-off voltage output from the gate driver to the gate of the switch element is adjusted during all or part of the turn-off voltage duration of each frame.

In step S22: the turn-off voltage output from the gate driver to the gate of the switch element is adjusted during all or part of the turn-off voltage duration of any number of frames, and the arbitrary number is less than the total number of frames continuously displayed by the LCD device.

In application, since in each frame time, the turn-off voltage may be adjusted in all or part of the turn-off voltage duration according to actual needs, to reduce the absolute value of the voltage difference between the turn-off voltage and the common voltage during this time. For example, if it is assumed that one frame time is T0, the duration of the turn-off voltage before adjustment is T1, and the duration of the turn-off voltage after adjustment is T2, then $T0>T1\geq T2$.

In application, when the liquid crystal display panel continues to display multiple frames of screens, it is also possible to adjust the turn-off voltage only in all or part of the turn-off voltage duration of any number of frames according to actual needs. For example, if it is assumed that N frames of screens are displayed continuously by the liquid crystal display panel, the turn-off voltage is adjusted only in all or part of the turn-off voltage duration of M frames, then $M<N$.

In application, if the duration of the continuous display of screens of the LCD panel is greater than 1 unit time, any number can be set to be less than the number of frames of the LCD panel. The number of frames of the LCD panel is defined as the total number of frames displayed in one unit time.

In application, when the liquid crystal display panel continues to display multiple frames of screens, the turn-off voltage output from the gate driver to the gate of the switch element may be adjusted during all or part of the turn-off voltage duration of any number of frames after every preset number of frames. The preset number can be set to any positive integer according to actual needs.

Figure 12:
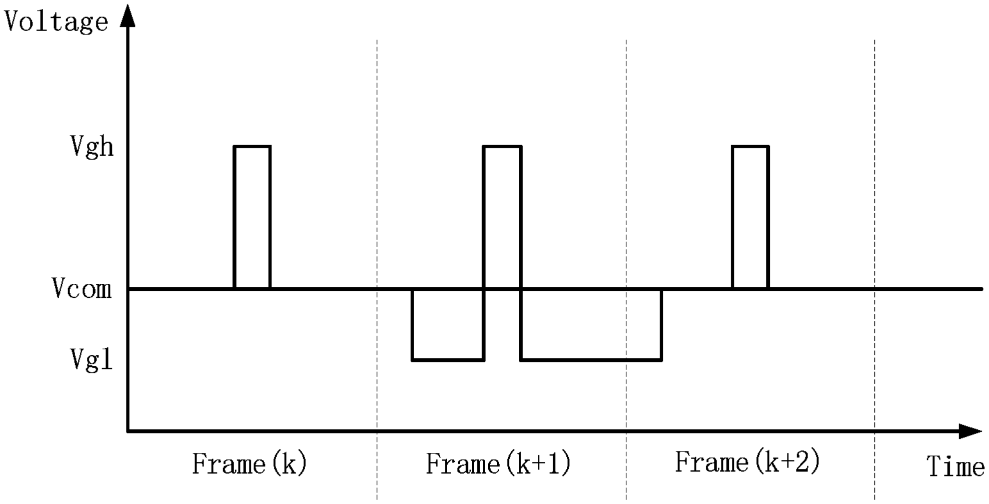
FIG. 12 is a schematic waveform diagram showing that the turn-off voltage is adjusted during part of the time of the (k+1)-th and (k+2)-th frames after the k-th frame when the switch element is an N-type switch element in accordance with an embodiment of the present application.

FIG. 12 exemplarily shows a waveform diagram that the turn-off voltage is adjusted during part of the time of the (k+1)-th and (k+2)-th frames after the k-th frame when the switch element is an N-type switch element. In FIG. 12, Frame (k) represents the k-th frame, Frame (k+1) represents the (k+1)-th frame, Frame (k+2) represents the (k+2)-th frame, Vgh represents the turn-on voltage, Vgl represents the turn-off voltage, Vcom represents the common voltage, the horizontal axis represents the time (Time), and the vertical axis represents the voltage (Voltage).

Figure 13:
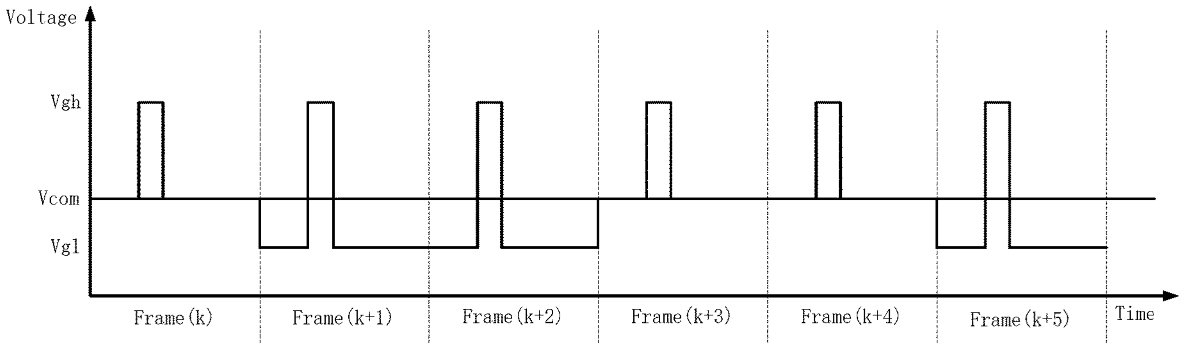
FIG. 13 is a schematic waveform diagram showing that the turn-off voltage is adjusted during the entire time of the (k+1)-th and (k+2)-th frames after the k-th frame, and the entire time of the (k+5)-th frame after the (k+3)-th and (k+4)-th frames when the switch element is an N-type switch element in accordance with an embodiment of the present application.

FIG. 13 exemplarily shows a waveform diagram that the turn-off voltage is adjusted during the entire time of the (k+1)-th and (k+2)-th frames after the k-th frame, and during the entire time of the (k+5)-th frame after the (k+3)-th and (k+4)-th frames when the switch element is an N-type switch element. In FIG. 13, Frame (k) represents the k-th frame, Frame (k+1) represents the (k+1)-th frame, Frame (k+2) represents the (k+2)-th frame, Frame (k+3) represents the (k+3)-th frame, Frame (k+4) represents the (k+4)-th frame, Frame (k+5) represents the (k+5)-th frame, Vgh represents the turn-on voltage, Vgl represents the turn-off voltage, Vcom represents the common voltage, the horizontal axis represents the time (Time), and the vertical axis represents the voltage (Voltage).

In accordance with an embodiment of the present application, a liquid crystal display device is also provided, which includes a gate driver and a switch element, and the switch element includes an active layer.

The gate driver is in electrical connection with a gate of the switch element.

The gate driver is configured to output a turn-on voltage to the gate of the switch element, to control the switch element to be switched on, so that a channel formed in the active layer is on conduction.

The gate driver is configured to output a turn-off voltage to the gate of the switch element, to control the switch element to be switched off, so that the channel formed in the active layer when the switch element is switched on is off conduction.

The turn-off voltage is approximate to the common voltage and is smaller than or equal to a cut-off voltage of the channel.

In application, the switch element may be a thin film transistor (TFT).

In application, relevant parameters of the gate driving device and the switch element may be designed during the manufacturing process of the LCD device through the hardware design method, that is, the turn-off voltage output from the gate driver is set to be approximate to the common voltage and lower than or equal to the cut-off voltage of the channel of the switch element, so that when the liquid crystal display panel after the completion of manufacture is subjected to external pressure, the phenomenon of light leakage at the dislocation caused by the dislocation between the color filter substrate and the array substrate can be effectively improved, thereby improving the display effect of the LCD device.

In application, the active layer is an N-type doped semiconductor material layer or a P-type undoped semiconductor material layer. In case that the active layer is an N-type doped semiconductor material layer, since the turn-on voltage>the common voltage>the turn-off voltage, the active layer needs to be doped to increase the trap density of the active layer, so that a larger forward voltage is required for the active layer to form the channel, that is, the absolute value of the voltage difference between the turn-off voltage and the common voltage can be reduced by boosting-up the turn-off voltage. On the contrary, in case that the active layer is a P-type undoped semiconductor material layer, since the turn-off voltage>the common voltage>the turn-on voltage, the active layer does not need to be doped, and the trap density of the active layer is low, and thus only a small forward voltage is required for the active layer to form the channel, that is, the absolute value of the voltage difference between the turn-off voltage and the common voltage can be reduced by stepping-down the turn-off voltage. The semiconductor material layer may be a hydrogenated amorphous silicon layer, an amorphous gallium nitride layer, an amorphous indium nitride layer, or the like.

It should be understood that the structure of the liquid crystal display panel provided in the embodiments of the present application only introduces the parts related to the invention, and in the actual application process, the liquid crystal display panel may also include other structures, such as the color filter substrate, the array substrate, liquid crystals between the film substrate and the array substrate, a source driver, a pressure sensing element, a human-computer interaction device, etc. which will not be repeated here.

In accordance with an embodiment of the present application, a drive apparatus is also provided, which is configured to perform the method steps in the foregoing method embodiments. The apparatus may be a virtual appliance in the liquid crystal display device, that is executable by a processor of the liquid crystal display device, or may be the liquid crystal display device itself.

Figure 14:
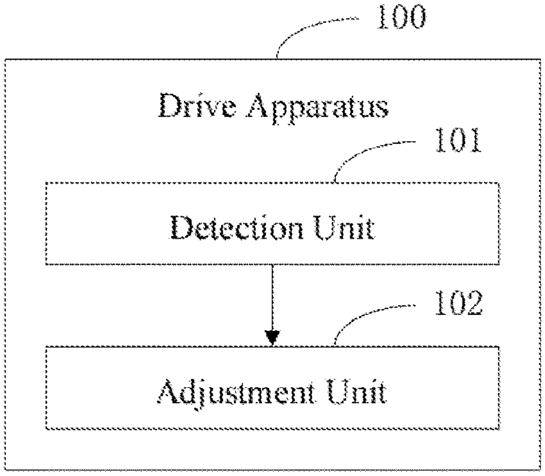
FIG. 14 is a schematic structural diagram of a driving device in accordance with an embodiment of the present application.

As shown in FIG. 14, the drive apparatus 100 provided in this embodiment of the present application includes a detection unit 101, and an adjustment unit 102.

The detection unit 101 is configured to detect whether a light leakage is occurred in the LCD device.

The adjustment unit 102 is configured to adjust the turn-off voltage output from the gate driver to the gate of the switch element to reduce the absolute value of the voltage difference between the turn-off voltage and the common voltage when the light leakage is occurred in the LCD device.

In application, each unit in the above apparatus may be a software program module, or may be implemented by different logic circuits integrated in the processor or independent physical components connected to the processor, or may be implemented by multiple distributed processors.

Figure 15:
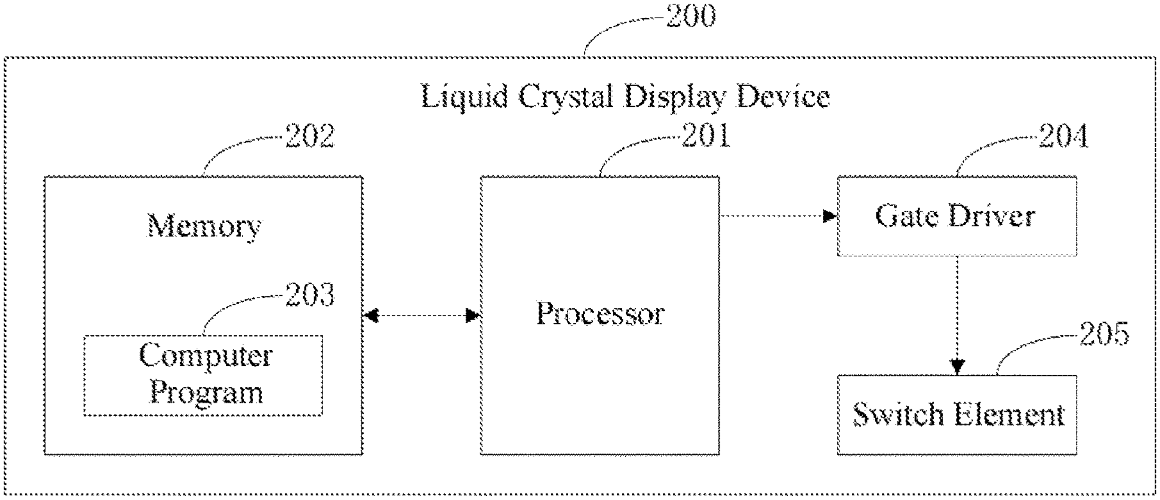
FIG. 15 is a schematic structural diagram of a liquid crystal display device in accordance with an embodiment of the present application.

As shown in FIG. 15, an embodiment of the present application further provides a liquid crystal display device 200, which includes: at least one processor 201 (only one processor is shown in FIG. 15), a memory 202, which is stored in the memory 202 and can be stored in at least one processor 201. A computer program 203, a gate driver 204, and a switch element 205 run on a processor 201. When the processor 201 executes the computer program 203, the steps in each of the foregoing method embodiments are implemented.

In application, the LCD device may include, but not limit to, a processor, a memory, a gate driver, and a switch element. FIG. 15 is only an example of the LCD device, and does not constitute a limitation on the LCD device. The LCD device may include more or less components than the above-listed, or a combination of some of the above components, or different components, such as a color filter substrate, an array substrate, liquid crystals filled between the color filter substrates and array substrates, a source driver, a pressure sensing element, a Human-computer interaction device, input and output devices, a network access device, etc. The network access device may include a communication module for communicating between the LCD device and the user terminal.

In application, the processor may be a central processing unit (CPU). The processor may also be other general-purpose processors, digital signal processors (DSP), application specific integrated circuits (ASIC), field-programmable gate array (FPGA) or other programmable logic devices, discrete gate or transistor logic devices, discrete hardware components, etc. For example, the processor may be a timing controller (TCON). The general-purpose processor may be a microprocessor. Or the processor may be any conventional processor or the like.

In application, the memory, in some embodiments, may be an internal storage unit of the LCD device, such as a hard disk or a memory of the LCD device. In other embodiments, the memory may also an external storage device of the LCD device, for example, a plug-in hard disk equipped on the LCD device, a smart media card (SMC), a secure digital (SD) card, a flash memory card, etc. The memory may also include both an internal storage unit and an external storage device of the LCD device. The memory may be used to store an operation system, application programs, a boot loader, data, and other programs, such as program codes of computer programs, and the like. The memory may also be used to temporarily store data that has been or will be output.

In application, the communication module may be any device that can directly or indirectly communicate with the user terminal by long-distance wired or wireless communication according to actual needs. For example, the communication module is capable of providing wireless local area network (WLAN, such as Wi-Fi network), Bluetooth, Zigbee, mobile communication network, global navigation satellite system (GNSS), frequency modulation (FM), near field communication (NFC), infrared (IR) technology and other communication solutions. The communication module may include an antenna. The antenna may have only one array element, or may be an antenna array including multiple array elements. The communication module can receive electromagnetic waves through the antenna, frequency modulate and filter the electromagnetic wave signals, and send the processed signals to the processor. The communication module may also receive the signal to be sent from the processor, perform frequency modulation and amplification on the signal, and then convert the signal into electromagnetic waves for radiation through the antenna.

It should be noted that the information exchange, execution process and other contents between the above-mentioned devices/units are based on the same concept as the method embodiments of the present application. For specific functions and technical effects, references can be made to the above method embodiments, which will not be repeated herein.

It can be clearly understood for those skilled in the art that, for the convenience and brevity of the description, the division of the above functional units is illustrated as an example. In practical applications, the above functions may be assigned by different functional units according to the needs, that is, the internal structure of the device may be divided into different functional units to complete all or part of the functions described above. Each functional unit in the embodiment may be integrated in one processing unit, or each unit may exist physically alone, or two or more units may be integrated in one unit, and the above-mentioned integrated units may be implemented in the form of hardware, and may also be implemented in the form of software functional units. In addition, specific names of the functional units are used only for the convenience of distinguishing from each other, and are not used to limit the protection scope of the present application. For the specific working process of the units in the above system, reference may be made to the corresponding process in the foregoing method embodiments, which will not be repeated herein.

In accordance with an embodiment of the present application, a computer-readable storage medium is also provided, in which a computer program is stored, and when the computer program is executed by a processor, the steps in the foregoing method embodiments can be implemented.

In accordance with an embodiment of the present application, a computer program product is also provided. When the computer program product runs on a liquid crystal display device, the LCD device is enabled to implement the steps in the foregoing method embodiments.

The integrated unit, if implemented in the form of a software functional unit and sold or used as an independent product, may be stored in a computer-readable storage medium. Based on this understanding, the implementation of all or part of the processes in the above methods embodiments of the present application, can be completed by instructing the relevant hardware through a computer program, and the computer program may be stored in a computer-readable storage medium. When the computer program is executed by a processor, the steps in each of the foregoing method embodiments can be implemented. The computer program includes computer program codes, and the computer program codes may be in the form of source codes, object codes, executable file or some intermediate form, and the like. The computer-readable medium may include at least: any entity or device capable of carrying the computer program codes to the LCD device, a recording medium, a computer memory, a read-only memory (ROM), a random-access memory (RAM), electrical carrier signals, telecommunication signals, and a software distribution media. For example, a U disk, a mobile hard disk, a disk or a CD, etc.

In the foregoing embodiments, the description of each embodiment has its own emphasis. For parts that are not recorded or described in detail in a certain embodiment, reference may be made to the relevant descriptions of other embodiments.

It will be appreciated for those of ordinary skill in the art that each exemplary unit and algorithm step described in conjunction with the embodiments disclosed herein can be implemented in electronic hardware, or a combination of computer software and electronic hardware. Whether these functions are performed in hardware or software depends on the specific application and design constraints in the embodiments. Skilled artisans may implement the described functionality using different methods for each particular application, but such implementations should not be considered beyond the scope of the present application.

It should be understood that the disclosed apparatus and method in the embodiments of the present application may be implemented in other manners. For example, the apparatus embodiments described above are only illustrative. For example, the division of the units is only a logical function division. In actual implementations, other division methods may be presented. For example, multiple units or components may be combined or integrated into another system, or some features may be ignored, or not implemented. In addition, the shown or discussed mutual coupling or direct coupling or communication connection may be indirect coupling or communication connection through some interfaces, devices or units, and may be in electrical, mechanical or other forms.

The units described as separate components may or may not be physically separated, and components displayed as units may or may not be physical units, that is, may be located in one place, or may be distributed to multiple network units. Some or all of the units may be selected according to actual needs to achieve the purpose of the solution in this embodiment.

The above-mentioned embodiments are only used to illustrate rather than limit the schemes of the present application. Although this disclosure has been described in detail with reference to the above-mentioned embodiments, it should be understood for those of ordinary skill in the art that the schemes in the above-mentioned embodiments may be modified, or some features in the schemes may be equivalently replaced. These modifications or replacements do not make the essence of the corresponding schemes deviate from the spirit and scope of the schemes in the embodiments of the present application, and thus should all be included within the protection scope of the present application.

What is claimed is:

1. A driving method of a liquid crystal display device, comprising:

detecting whether a light leakage has occurred in the liquid crystal display device; and adjusting a turn-off voltage output from a gate driver to a gate of a switch element to reduce an absolute value of a voltage difference between the turn-off voltage and a common voltage, when the light leakage has occurred in the liquid crystal display device, wherein said adjusting the turn-off voltage output from the gate driver to the gate of the switch element to reduce the absolute value of the voltage difference between the turn-off voltage and the common voltage comprises:

boosting up the turn-off voltage to reduce the absolute value of the voltage difference between the turn-off voltage and the common voltage when an active layer of the switch element is an N-type doped semiconductor material layer, wherein the active layer has a high trap density, the turn-on voltage>the common voltage>the turn-off voltage; and stepping down the turn-off voltage to reduce the absolute value of the voltage difference between the turn-off voltage and the common voltage when the active layer of the switch element is a P-type undoped semiconductor material layer, wherein the active layer has a low trap density, the turn-off voltage>the common voltage>the turn-on voltage.

2. The driving method according to claim 1, wherein the adjusting the turn-off voltage output from the gate driver to the gate of the switch element comprises:

adjusting the turn-off voltage output from the gate driver to the gate of the switch element during all or part of a turn-off voltage duration of each frame; or adjusting the turn-off voltage output from the gate driver to the gate of the switch element during all or part of the turn-off voltage duration of any number of frames, wherein the any number of frames is less than the total number of frames continuously displayed by the liquid crystal display device.

3. The driving method according to claim 2, wherein the adjusting the turn-off voltage output from the gate driver to the gate of the switch element during all or part of the turn-off voltage duration of any number of frames comprises:

adjusting, after every preset number of frames, the turn-off voltage output from the gate driver to the gate of the switch element during all or part of the turn-off voltage duration of any number of frames.

4. The driving method according to claim 1, wherein the absolute value of the voltage difference between the turn-off voltage and the common voltage reduction comprises:

the absolute value of the voltage difference between the turn-off voltage and the common voltage is reduced to zero.

5. The driving method according to claim 1, wherein the detecting whether the light leakage has occurred in the liquid crystal display device comprises:

detecting an external pressure acted on the liquid crystal display device; and determining that the light leakage has occurred in the liquid crystal display device when the external pressure is greater than a preset pressure; or detecting whether a light-leakage instruction is input by a user; and determining that the light leakage has occurred in the liquid crystal display device when the light-leakage instruction is detected.

6. The driving method according to claim 5, wherein the detecting the external pressure acted on the liquid crystal display device comprises:

detecting the external pressure acted on the liquid crystal display device through a pressure sensing element; and wherein the detecting whether the light-leakage instruction is input by the user comprises:

detecting whether the light-leakage instruction is input by the user through a human-computer interaction device.

7. A liquid crystal display device, comprising:

a switch element, comprising an active layer; and a gate driver, in electrical connection with a gate of the switch element;

wherein the gate driver is configured to output a turn-on voltage to the gate of the switch element, to control the switch element to be switched on, to enable a channel formed in the active layer to be conductive;

wherein the gate driver is configured to output a turn-off voltage to the gate of the switch element, to control the switch element to be switched off, to enable the channel formed in the active layer when the switch element is switched on to be non-conductive; and wherein the turn-off voltage is approximate to a common voltage and is lower than or equal to a cut-off voltage of the channel, wherein the active layer is an N-type doped semiconductor material layer or a P-type undoped semiconductor material layer, wherein when the active layer is an N-type doped semiconductor material layer, the active layer has a high trap density, the turn-on voltage>the common voltage>the turn-off voltage, and the absolute value of the voltage difference between the turn-off voltage and the common voltage is reduced through a boosting up of the turn-off voltage; and when the active layer is a P-type undoped semiconductor material layer, the active layer has a low trap density, the turn-off voltage>the common voltage>the turn-on voltage, and the absolute value of the voltage difference between the turn-off voltage and the common voltage is reduced through a stepping down of the turn-off voltage.

8. A liquid crystal display device, comprising: a gate driver, a switch element, a memory, a processor, and a computer program stored in the memory and executable by the processor, wherein the computer program, when being executed by the processor, causes the liquid crystal display device to perform operations that comprise:

detecting whether a light leakage has occurred in the liquid crystal display device; and adjusting a turn-off voltage output from a gate driver to a gate of a switch element to reduce an absolute value of a voltage difference between the turn-off voltage and a common voltage when the light leakage has occurred in the liquid crystal display device, wherein the operation of adjusting the turn-off voltage output from the gate driver to the gate of the switch element to reduce the absolute value of the voltage difference between the turn-off voltage and the common voltage comprises:

boosting up the turn-off voltage to reduce the absolute value of the voltage difference between the turn-off voltage and the common voltage when an active layer of the switch element is an N-type doped semiconductor material layer, wherein the active layer has a high trap density, the turn-on voltage>the common voltage>the turn-off voltage; and stepping down the turn-off voltage to reduce the absolute value of the voltage difference between the turn-off voltage and the common voltage when the active layer of the switch element is a P-type undoped semiconductor material layer, wherein the active layer has a low trap density, the turn-off voltage>the common voltage>the turn-on voltage.

9. The liquid crystal display device according to claim 8, wherein the operation of adjusting the turn-off voltage output from the gate driver to the gate of the switch element comprises:

adjusting the turn-off voltage output from the gate driver to the gate of the switch element during all or part of a turn-off voltage duration of each frame; or adjusting the turn-off voltage output from the gate driver to the gate of the switch element during all or part of the turn-off voltage duration of any number of frames, wherein the any number of frames is less than the total number of frames continuously displayed by the liquid crystal display device.

10. The liquid crystal display device according to claim 9, wherein the operation of adjusting the turn-off voltage output from the gate driver to the gate of the switch element during all or part of the turn-off voltage duration of any number of frames comprises:

adjusting, after every preset number of frames, the turn-off voltage output from the gate driver to the gate of the switch element during all or part of the turn-off voltage duration of any number of frames.

11. The liquid crystal display device according to claim 8, wherein the operation of adjusting the turn-off voltage output from the gate driver to the gate of the switch element comprises:

boosting-up the turn-off voltage output from the gate driver to the gate of the switch element when the switch element is an N-type switch element; and stepping-down the turn-off voltage output from the gate driver to the gate of the switch element when the switch element is a P-type switch element.

12. The liquid crystal display device according to claim 8, wherein the absolute value of the voltage difference between the turn-off voltage and the common voltage is reduced comprises:

the absolute value of the voltage difference between the turn-off voltage and the common voltage is reduced to zero.

13. The liquid crystal display device according to claim 8, wherein the operation of detecting whether the light leakage has occurred in the liquid crystal display device comprises:

detecting an external pressure acted on the liquid crystal display device; and determining that the light leakage has occurred in the liquid crystal display device when the external pressure is greater than a preset pressure; or detecting whether a light-leakage instruction is input by a user; and determining that the light leakage has occurred in the liquid crystal display device when the light-leakage instruction is detected.

14. The liquid crystal display device according to claim 13, wherein the operation of detecting the external pressure acted on the liquid crystal display device comprises:

detecting the external pressure acted on the liquid crystal display device through a pressure sensing element; and wherein the detecting whether the light-leakage instruction is input by the user comprises:

detecting whether the light-leakage instruction is input by the user through a human-computer interaction device.

* * * * *